(12) United States Patent
Sciulli

(10) Patent No.: US 6,540,586 B2
(45) Date of Patent: Apr. 1, 2003

(54) APPARATUS AND METHODS FOR COLLISION DETECTION AND RECOVERY FOR WATERJET CUTTING SYSTEMS

(75) Inventor: Felice M. Sciulli, Issaquah, WA (US)

(73) Assignee: Flow International Corporation, Kent, WA (US)

( * ) Notice: Subject to any disclaimer, the term of this patent is extended or adjusted under 35 U.S.C. 154(b) by 245 days.

(21) Appl. No.: 09/754,851

(22) Filed: Jan. 3, 2001

(65) Prior Publication Data

US 2001/0018855 A1 Sep. 6, 2001

Related U.S. Application Data

(63) Continuation-in-part of application No. 09/382,554, filed on Aug. 25, 1999, now Pat. No. 6,379,214.

(51) Int. Cl.[7] .............................. B24C 1/00; B26D 7/00
(52) U.S. Cl. .................... 451/2; 451/3; 451/5; 451/10; 451/24; 451/38; 83/22; 83/66; 83/73; 83/177
(58) Field of Search .............................. 451/2, 3, 5, 10, 451/24, 38; 83/22, 66, 73, 177; 219/69.19, 69.16

(56) References Cited

U.S. PATENT DOCUMENTS

| | | | |
|---|---|---|---|
| 3,823,928 A | 7/1974 | Stolin et al. | 266/23 |
| 3,829,622 A | 8/1974 | Elliott | 179/100.3 |
| 3,894,180 A | 7/1975 | Canino | 178/6.6 |

(List continued on next page.)

FOREIGN PATENT DOCUMENTS

| | | |
|---|---|---|
| DE | 36 20 898 A1 | 12/1987 |
| DE | 94 19 477.7 | 2/1995 |
| DE | 44 22 691 A1 | 1/1996 |

(List continued on next page.)

OTHER PUBLICATIONS

Renishaw, PLC, *Renishaw—the innovative touch*; Registered No. 1106260, England, http://www.renishaw.com/index.html; 2 pages; printed Aug. 20, 1999.

The University of California at Berkeley, *Technology/Business Opportunity Non–Confidential Disclosure*, "Micropositioning Apparatus Using Linear Force Actuator," U.S. patent No. 5,323,012, http://otl.berkeley.edu/UCB91016.html, 3 pages, printed Aug. 22, 1999.

Derwent Abstract: High Pressure Water Jet Cutter—has a cutter head fitted to a carrier which has a sensor element to stop collisions.

*Primary Examiner*—M. Rachuba
(74) *Attorney, Agent, or Firm*—Seed Intellectual Property Law Group PLLC

(57) ABSTRACT

This invention relates to apparatus and methods for collision detection and recovery for waterjet and abrasive-jet cutting systems. In one embodiment, an apparatus includes a first mount member coupleable to a controllably positionable mounting portion of the cutting system, and a second mount member coupleable to the cutting head and disengageably or movably coupled to the first mount member. Embodiments of the inventions may also have a sensing circuit having at least one first conductive element disposed on the first mount member and at least one second conductive element disposed on the second mount member. In the event of a collision between the cutting head and an obstruction, the second mount member disengages from or moves with respect to the first mount member to prevent breakage of the cutting head. This movement causes the first and second conductive elements to touch, signaling a collision and shutting down one or more internal systems. Following the collision, the second mount member is quickly and easily re-engaged with the first mount member without time-consuming re-calibration. In one embodiment, re-engagement of the second end first mount members is automatically performed by a biasing member.

51 Claims, 13 Drawing Sheets

U.S. PATENT DOCUMENTS

| | | | |
|---|---|---|---|
| 3,978,748 A | 9/1976 | Leslie et al. | 83/53 |
| 4,006,294 A | 2/1977 | Canino | 358/127 |
| 4,675,492 A | 6/1987 | Yokomichi et al. | 219/69 |
| 4,814,574 A | 3/1989 | Babel | 219/69 |
| 4,848,042 A | 7/1989 | Smith et al. | 51/410 |
| 4,899,993 A | 2/1990 | Habermann et al. | 266/77 |
| 4,975,557 A | 12/1990 | Yamada et al. | 219/69.12 |
| 4,987,822 A | 1/1991 | Stoll | 91/358 R |
| 5,128,505 A | 7/1992 | Matter | 219/69.12 |
| 5,183,990 A * | 2/1993 | Enyedy | 219/121.54 |
| 5,204,598 A | 4/1993 | Torii et al. | 318/568.1 |
| 5,404,649 A | 4/1995 | Hajdukiewicz et al. | 33/503 |
| 5,505,005 A | 4/1996 | McMurtry et al. | 33/561 |
| 5,643,058 A | 7/1997 | Erichsen et al. | 451/99 |
| 5,782,673 A | 7/1998 | Warehime | 451/2 |
| 5,925,267 A * | 7/1999 | Kitahashi | 219/121.57 |
| 6,077,152 A | 6/2000 | Warehime | 451/75 |
| 6,274,842 B1 * | 8/2001 | Warren et al. | 219/121.44 |
| 6,379,214 B1 * | 4/2002 | Stewart et al. | 451/2 |

FOREIGN PATENT DOCUMENTS

| | | |
|---|---|---|
| EP | 0 417 024 A1 | 3/1991 |
| FR | 2 699 852 A1 | 7/1994 |
| GB | 2 330 097 A | 4/1999 |
| JP | 9-207051 | 8/1997 |
| JP | 11 333656 A | 7/1999 |
| WO | WO 98/17439 | 4/1998 |
| WO | WO 01/14101 A2 | 3/2001 |

* cited by examiner

APPARATUS AND METHODS FOR COLLISION DETECTION AND RECOVERY FOR WATERJET CUTTING SYSTEMS

CROSS-REFERENCE TO RELATED APPLICATION

This application is a continuation-in-part of U.S. patent application Ser. No. 09/382,554, filed Aug. 25, 1999 now U.S. Pat. No. 6,379,214.

TECHNICAL FIELD

This invention relates to apparatus and methods for collision detection and recovery for waterjet and abrasive-jet cutting systems.

BACKGROUND OF THE INVENTION

Waterjet and abrasive-jet cutting systems are used for cutting a wide variety of materials. In a typical waterjet cutting system, a high-pressure fluid (e.g., water) flows through a cutting head having a cutting nozzle that directs a cutting jet onto a workpiece. The cutting nozzle may include a mixing tube for introducing an abrasive into the high-pressure cutting jet to form an abrasive cutting jet. The cutting nozzle may then be controllably moved across the workpiece to cut the workpiece into the desired shape. After the cutting jet (or abrasive cutting jet) passes through the workpiece, the energy of the cutting jet is dissipated and the fluid is collected in a catcher tank for disposal. Waterjet and abrasive jet cutting systems of this type are shown and described, for example, in U.S. Pat. No. 5,643,058 issued to Erichsen et al. and assigned to Flow International Corp. of Kent, Wash., which patent is incorporated herein by reference. The '058 patent corresponds to Flow International's Paser 3 abrasive cutting systems.

FIG. 1 is an isometric view of a waterjet cutting system 10 in accordance with the prior art. The waterjet cutting system 10 includes a cutting head 20 coupled to a mount assembly 30. The mount assembly 30 is controllably driven by a control gantry 40 having a drive assembly 42 that controllably positions the cutting head 20 throughout an x-y plane that is substantially parallel to a surface 14 of a workpiece 12. Typically, the drive assembly 42 may include a pair of ball-screw drives oriented along the x and y axes and a pair of electric drive motors. Alternately, the drive assembly 42 may include a five axis motion system. Two-axis and five-axis control gantries are commercially-available as the WMC (Waterjet Machining Center) and the A and AF Series Waterjet cutting systems from Flow International of Kent, Wash.

FIG. 2 is a partial-elevational side view of the cutting head 20 and the mount assembly 30 of the waterjet cutting system 100 of FIG. 1. The cutting head 20 includes a high-pressure fluid inlet 22 coupled to a high-pressure fluid source 50, such as a high-pressure or ultra-high pressure pump, by a high-pressure line 23. In this embodiment, the cutting head 20 includes a nozzle body 24 and a mixing tube 26 terminating in a jet exit port 28. Although the term "mixing tube" is commonly used to refer to that portion of the cutting head of an abrasive jet cutting system in which abrasive is mixed with a high-pressure fluid jet to form an abrasive cutting jet, in the following discussion, "mixing tube" is used to refer to that portion of the cutting head 20 that is closest to the workpiece 12, regardless of whether the waterjet cutting system uses an abrasive or non-abrasive cutting jet.

The mount assembly 30 includes a mounting arm 32 having a mounting aperture 34 disposed therethrough. The mounting arm 32 is coupled to a lower portion 44 of the control gantry 40. The nozzle body 24 of the cutting head 20 is secured within the mounting aperture 34 of the mounting arm 32.

In operation, high-pressure fluid from the high-pressure fluid source 50 enters the high-pressure fluid inlet 22, travels through the nozzle body 24 and mixing tube 26, and exits from the jet exit port 28 toward the workpiece 12 as a cutting jet 16. The cutting jet 16 pierces the workpiece 12 and performs the desired cutting. Using the control gantry 40, the cutting head 20 is traversed across the workpiece 12 in the desired direction or pattern.

To maximize the efficiency and quality of the cut, a standoff distance d (FIG. 2) between the jet exit port 28 of the mixing tube 26 and the surface 14 of the workpiece 12 must be carefully controlled. If the standoff distance d is too close, the mixing tube 26 can plug during piercing, causing system shutdown and possibly a damaged workpiece 12. If the distance is too far, the quality and accuracy of the cut suffers.

The mixing tube at 26 is typically fabricated of specially formulated wear-resistant carbides to reduce wear. Particularly for abrasive cutting systems, the mixing tube 26 suffers extreme wear due to its constant contact with high velocity abrasives. Thus, mixing tubes are a relatively expensive component of the cutting head 20. The specially formulated carbides are also quite brittle, and can easily break if the mixing tube 26 collides with an obstruction during operation of the cutting system 10, such as fixturing or cut-out portions of the workpiece 12 which have been kicked up during the cutting operation. Accidental breakage of the mixing tube 26 increases operational costs and downtime of the cutting system 10.

Current collision sensors use a ring sensor disposed about the mixing tube 26 which slides along or slightly above the surface 14 of the workpiece 12. The ring sensor indicates the relative height of the workpiece. A motorized ball-screw drives the cutting head up and down to maintain the required standoff distance. When the ring collides with a kicked-up part or other obstruction, a detector detects the collision and sends a stop signal to the control gantry to stop the movement of the mixing tube in an attempt to avoid the collision.

A fundamental problem with such collision sensors is that they must have a large enough "safety buffer" between the sensor and a mixing tube to allow the control gantry enough time to stop without damaging the mixing tube. Due to the size and speed of modern cutting systems, the task of stopping the control gantry quickly to avoid a collision is quite difficult. Another problem is that any shifting of the components requires a lengthy re-calibration routine to ensure the proper standoff distance d. A serious collision can irreparably damage the ring sensor.

One approach has been to simply make the ring larger the allow to control gantry more time and room to stop. This approach, however, prevents the cutting jet 16 from cutting near obstructions and fixtures commonly found around the edges of the workpiece 12, thereby wasting material. Enlarging the ring also increases the occurrence of erroneous collision signals which results in unnecessary downtime of the cutting system. Finally, existing ring sensor devices are expensive and are not robust in detecting surface height or collisions when operating the control gantry at high-speed or under dirty conditions.

SUMMARY OF THE INVENTION

This invention relates to apparatus and methods for z-axis control and collision detection and recovery for waterjet and abrasive-jet cutting systems. In one aspect of the invention, an apparatus includes a linear rail, a slide member coupleable to the cutting head and slideably coupled to the linear rail, at least one actuator having a first end coupled to the slide member and a second end fixed with respect to the linear rail, a position sensor coupled to the slide member, and a controller. The actuator provides an adjustable support force that supports the weight of the cutting head, allowing the cutting head to be controllably positioned at a desired height above the workpiece. The actuator may include a pneumatic cylinder, or alternately, a linear motor.

In another aspect, an apparatus according to the invention includes a first mount member coupleable to a controllably positionable mounting surface of the waterjet cutting system, a second mount member coupleable to the cutting head and disengageably coupled to the first mount member, and a sensing circuit having a plurality of first conductive elements disposed on the first mount member and a plurality of second conductive elements disposed on the second mount member. In the event of a collision between the cutting head and an obstruction, the second mount member disengages from the first mount member to prevent breakage of the cutting head. Following the collision, the second mount member is quickly and easily re-engaged with the first mount member without time-consuming re-calibration. In one embodiment, re-engagement of the second and first mount members is automatically performed by a biasing member.

In another aspect, an apparatus according to the invention includes a first mount member coupleable to a controllably positionable portion of the waterjet cutting system, and a second mount member coupleable to the cutting head. The second mount member is rotatably engaged with the first mount member. In the event of a collision between the cutting head and an obstruction, the second mount member rotates with respect to the first mount member and the waterjet cutting system to prevent breakage of the cutting head. A biasing member coupled to the second mount member urges the second member back to the proper orientation for operation. The system can incorporate an open sensing circuit having a first contact coupled to the second mount member and a second contact coupled to ground. The first contact is adjustably spaced from the second contact such that rotation of the second mount member caused by displacement of the cutting head during collision results in the first contact touching the second contact, thereby closing the sensing circuit. Accordingly, a collision by the cutting head results in a signal that, for example, stops movement of the gantry to prevent damage to the cutting head.

In another aspect, a method of controlling a height of a cutting head of a waterjet cutting system over a surface of a workpiece includes coupling a first end of a contact member to the cutting head, engaging a second end of the contact member with the surface of the workpiece, providing an adjustably controllable support force to support a weight of the cutting head, and slightly reducing the support force to slightly downwardly bias the contact member into engagement with the surface of the workpiece. The position control method advantageously provides a simple height measurement system and also allows for automatic adjustment for changes in friction or weight of various components of the waterjet cutting system.

DETAILED DESCRIPTION OF THE INVENTION

The present disclosure is directed toward apparatus and methods for z-axis control and collision detection and recovery of cutting heads of waterjet cutting systems. Specific details of certain embodiments of the invention are set forth in the following description, and in FIGS. 3–13 to provide a thorough understanding of such embodiments. A person of ordinary skill in the art, however, will understand that the present invention may have additional embodiments, and that the invention may be practiced without several of the details described in the following description.

Figure 1:
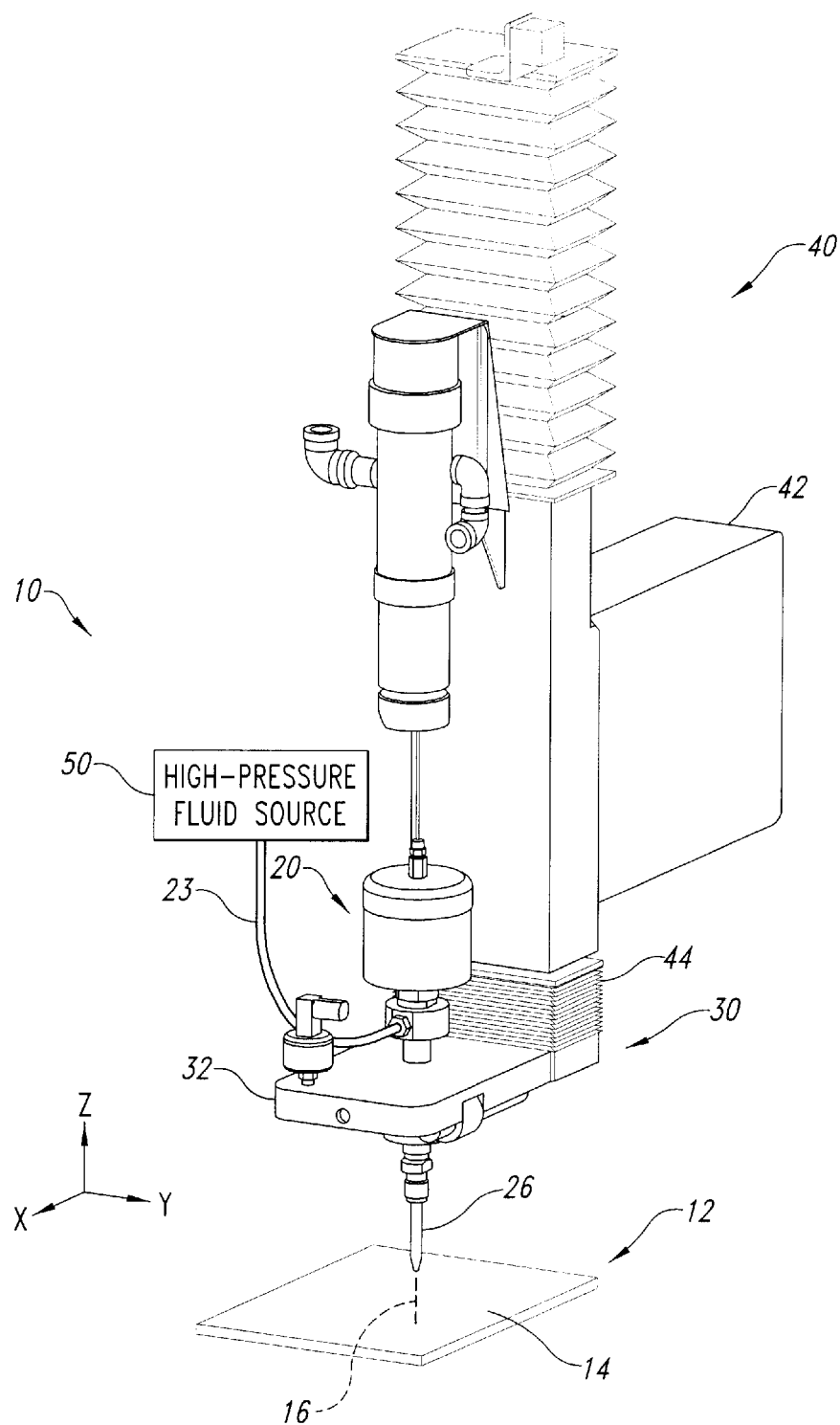
FIG. 1 is an isometric view of a waterjet cutting system in accordance with the prior art.
Figure 2:
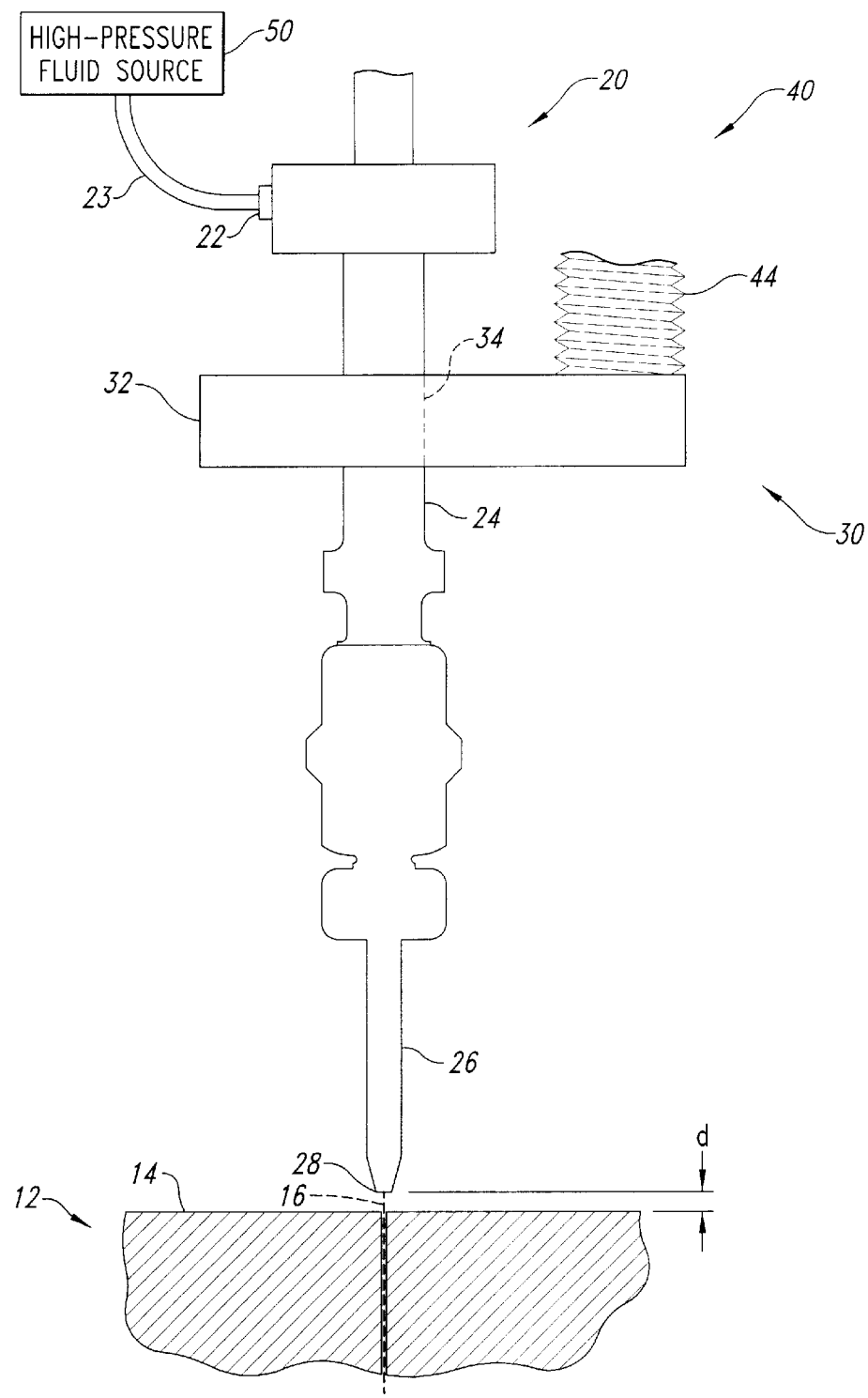
FIG. 2 is a side partial-elevational view of a cutting head and a mount assembly of the waterjet cutting system of FIG. 1.
Figure 3:
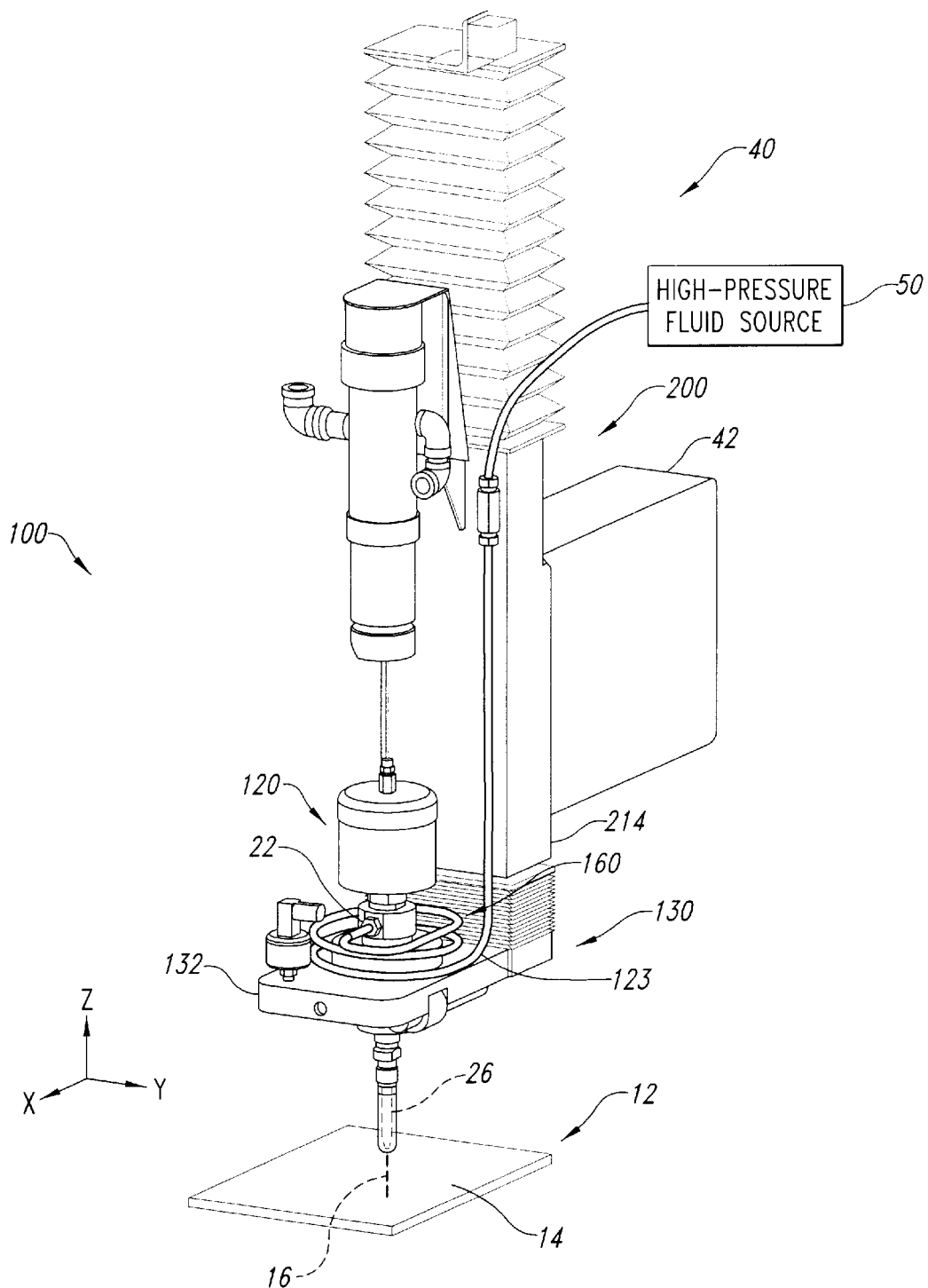
FIG. 3 is a front isometric view of a waterjet cutting system in accordance with an embodiment of the invention.

FIG. 3 is an isometric view of a waterjet cutting system 100 in accordance with an embodiment of the invention. The waterjet cutting system 100 includes a cutting head 120 coupled to a disengageable (or "breakaway") mounting assembly 160. In the event of a collision, the disengageable mounting assembly 160 advantageously disengages (or "breaks") to prevent breakage of the mixing tube 26 or other cutting head components. After the collision occurs and the waterjet cutting system 100 has been stopped, the disengageable mounting assembly 160 may be easily re-engaged and the cutting operation continued without lengthy re-calibration procedures.

The waterjet cutting system 100 also includes a high-pressure fluid source 50 fluidly coupled to the cutting head 120 by a coiled high-pressure line 123. The disengageable mounting system 160 is attached to a mounting arm 132, the mounting arm being coupled to a control gantry 40 as described above. The high-pressure fluid source 50 may, for example, be a high-pressure or ultra-high pressure pump, such as the commercially-available Intensifer pump models (7X, 20X, and 25X) available from Flow International of Kent, Wash.

Figure 4:
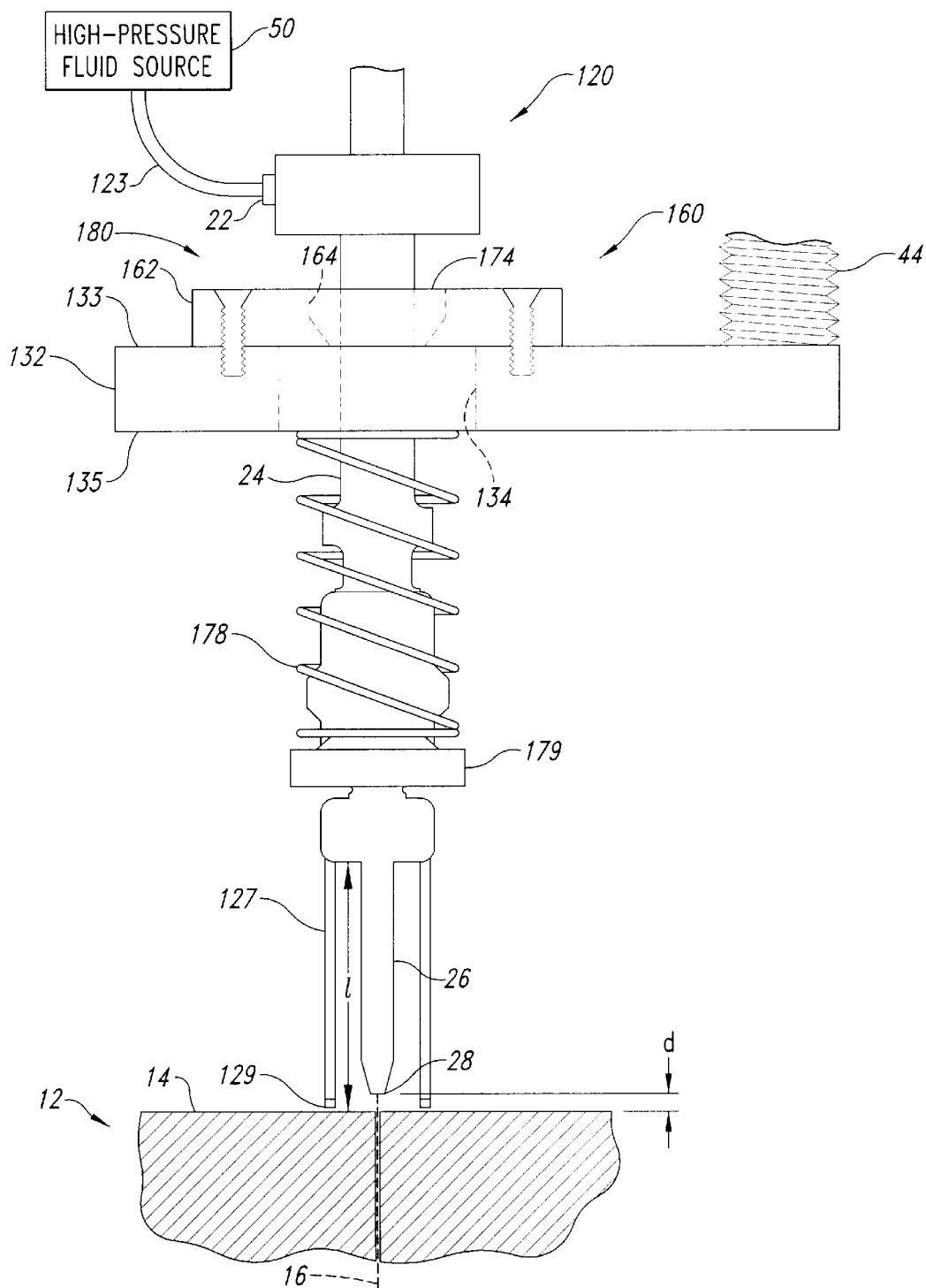
FIG. 4 is a partial-sectional side view of a cutting head and a disengageable mount assembly of the waterjet cutting system of FIG. 3.
Figure 5:
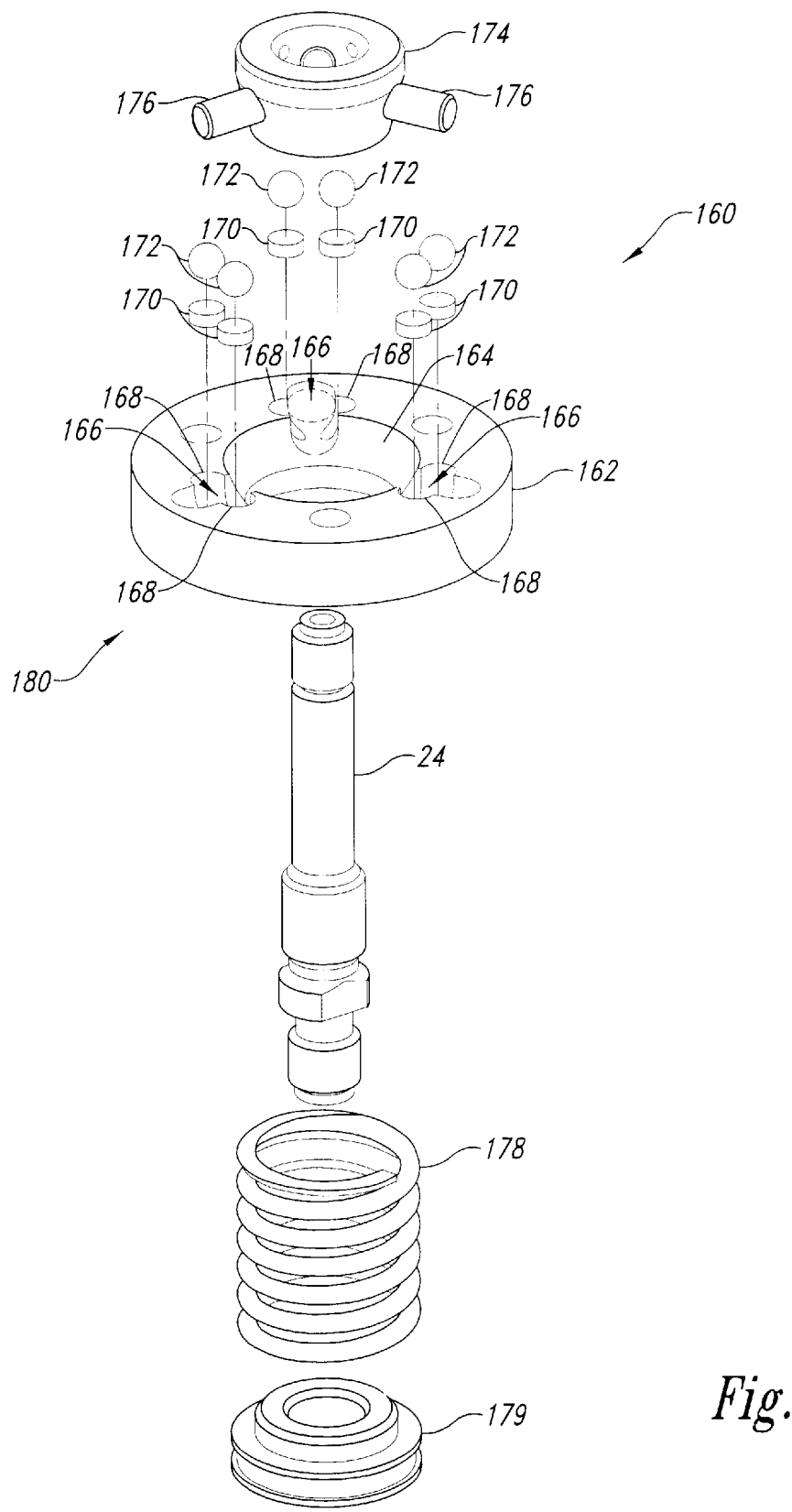
FIG. 5 is an exploded isometric view of the disengageable mount assembly of FIG. 4.

FIG. 4 is a partial-sectional side view of the cutting head 120 and the disengageable mount assembly 160 of the waterjet cutting system 100 of FIG. 3. FIG. 5 is an exploded isometric view of the disengageable mount assembly 160 of FIG. 4. As shown in FIG. 4, the cutting head 120 includes a high-pressure fluid inlet 22 coupled to the coiled high-pressure line 123, a nozzle body 24 and a mixing tube 26. The mixing tube 26 includes a jet exit port 28 out of which a cutting jet 16 emanates toward a workpiece 12. A collision shield 127 is disposed about the mixing tube 26 to shield the mixing tube 26 from collisions. The collision shield 127 includes a wear ring 129. In some modes of operation of the waterjet cutting system 100, as described more fully below, the wear ring 129 engages a surface 14 of the workpiece 12, while in other modes of operation the wear ring 129 is positioned slightly above the surface 14. The wear ring 129 may be formed of the same material as the collision shield 127, or alternately, may be formed of a low-friction material, such as, for example, Teflon®. The collision shield 127 has a length l that is sized to provide a constant, desired standoff distance d between the jet exit port 28 and the surface 14.

The disengageable mounting assembly 160 includes a retainer 162 attached to an upper surface 133 of the mounting arm 132. The mounting arm 132 has an enlarged mounting aperture 134 disposed therethrough. The retainer 162 includes a seating aperture 164 that is aligned with the enlarged mounting aperture 134 of the mounting arm 132. As best seen in FIG. 5, the retainer 162 further includes three pin cavities 166 disposed about the circumference of the seating aperture 164. Each pin cavity 166 has a pair of rounded pockets 168 disposed on opposite sides of each cavity. An electrically-conductive strike pad 170 is positioned at the bottom of each rounded pocket 168. Similarly, an electrically-conductive ball 172 is positioned within each rounded pocket 168 in contact with the associated strike pad 170.

A clamping collar 174 is attached to the nozzle body 24 of the cutting head 120 and is partially disposed within the seating aperture 164. Three conductive pins 176 project from the clamping collar 174. With the clamping collar 174 seated in the seating aperture 164, the conductive pins 176 projecting to the pin cavities 166 and contact the conductive balls 172. The disengageable mounting assembly 160 also includes a seating force spring 178 disposed about the nozzle body 24 and engaged against a lower surface 135 of the mounting arm 132. A tensioner 179 is engaged onto the nozzle body 24 (e.g., threadedly engaged) and partially compresses the seating force spring 178. A collision sensing circuit 180 is formed on the retainer 162, as described more fully below.

Figure 6:
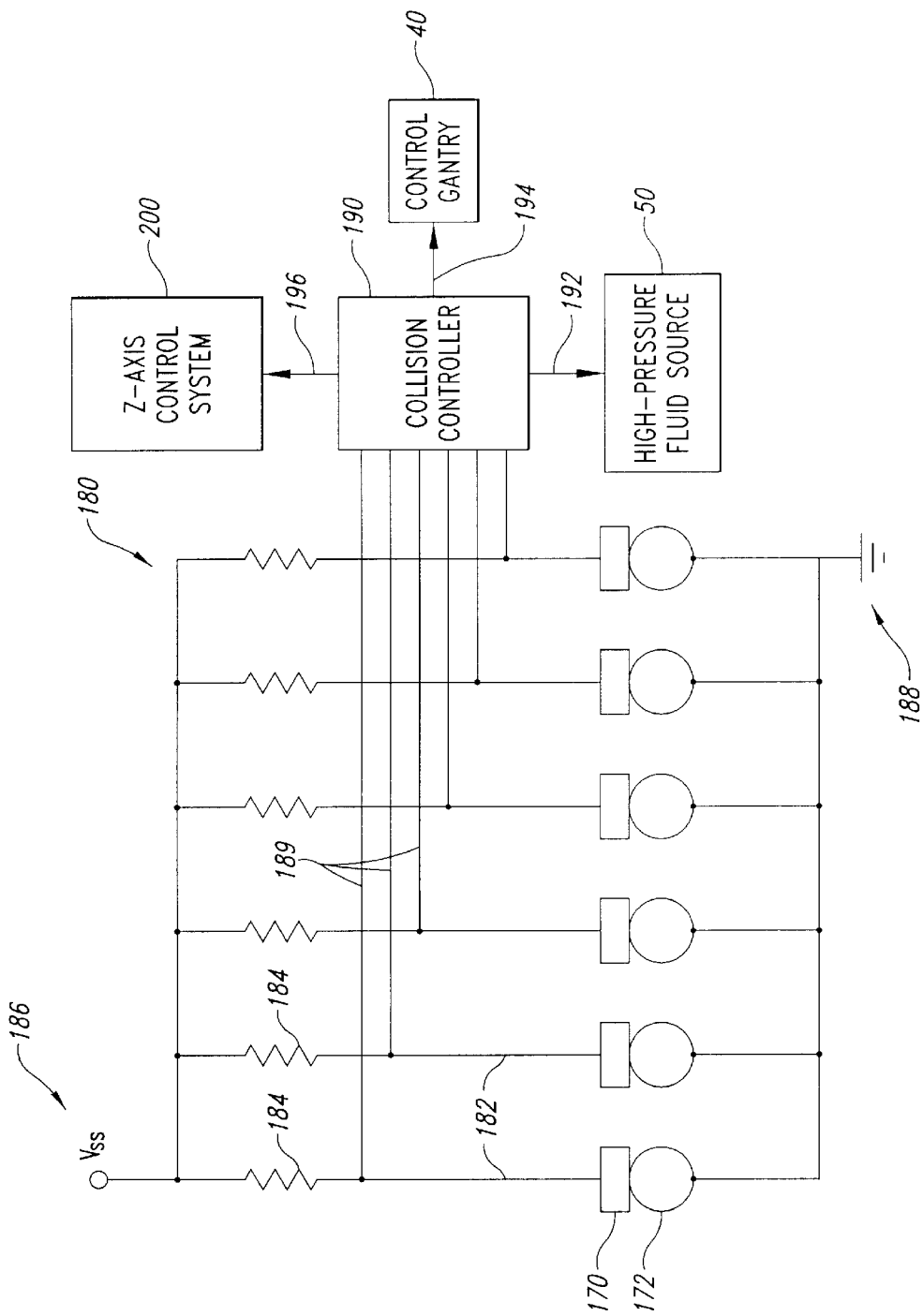
FIG. 6 is a schematic view of a collision sensing circuit according to an embodiment of the present invention.

FIG. 6 is a schematic view of the collision sensing circuit 180 of the disengageable mount assembly 160 of FIG. 5. The collision sensing circuit 180 includes a plurality of conductive elements 182 coupled to the strike pads 170 and to resistors 184 in parallel fashion. A voltage source 186 is electrically coupled to the resistors 184. The strike pads 170 are electrical contact with the conductive balls 172 which are coupled by additional conductive elements 182 to ground 188. Each resistor 184, strike pads 170, and conductive ball 172 form a branch of the parallel circuit. Secondary conductive elements 189 are electrically coupled to a collision controller 190 and to the conductive elements 182 between the resistors 24 and the strike pads 170. The collision controller 190 transmits a first collision detection signal 192 to the high-pressure fluid source 50. The collision controller 190 also transmits of second collision detection signal 194 to the control gantry 40 and a third collision detection signal 196 to a z-axis control assembly 200, described more fully below.

The disengageable mounting assembly embodiment 160 shown in FIGS. 5 and 6 is known as a Kelvin clamp. Kelvin clamps have been employed in touch probes and other precision instrumentation, such as the coordinate measurement machines (CMM's) sold by Renishaw PLC of Gloucestershire, UK, as shown and described at www.renishaw.uk.com.

In operation, the disengageable mount assembly 160 prevents breakage of the mixing tube 26 by disengaging in the event of collision. As the control gantry 40 moves the cutting head 120 in the x-y plane substantially parallel to the surface 14 of the workpiece 12, the wear ring 129 moves across the surface 14. In this embodiment, the collision shield 127 is disposed about the mixing tube 26. When the collision shield 127 strikes an obstruction, the force of the collision exerts a torque on the nozzle body 24 of the cutting head 120. The nozzle body 24 begins to swing within the enlarged mounting aperture 134 of the mounting arm 132, causing the clamping collar 174 to rotate within the seating aperture 164. The collision force required to pivot the nozzle body 24 is determined by the amount of compression force into seating force spring 178, which is adjusted by adjusting the position of the tensioner 179.

As the clamping collar 174 rotates, one or more of the conductive pins 176 become disengaged from the associated conductive balls 172, thereby breaking the circuit in one or more of the branches of the collision sensing circuit 180. The collision controller 190 monitors the branches of the collision sensing circuit 180 via the second conductive leads 189, and detects the occurrence of the collision. The collision controller 190 then transmits the first collision detection signal 192 to the high-pressure fluid source 50 to shut off the flow of high-pressure fluid through the cutting head 160. The collision controller 190 also transmits the second collision detection signal 194 to the control gantry 40 to stop movement of the cutting head 160. Finally, the collision controller 190 transmits the third collision detection signal 196 to the z-axis control system 200. Alternately, for an abrasive jet cutting systems, the collision controller 190 may also transmit a fourth collision detection signal to shutoff a flow of abrasive to the cutting head 120.

After the waterjet cutting system 100 has been shut down by the collision controller 190, the collision shield 127 is disengaged from the obstruction, and the disengageable mount assembly 160 is simply re-engaged by re-seating the clamping collar 174 within the seating aperture 164, and re-seating the conductive pins 176 within the pin cavities 166. In this embodiment, the clamping collar 174 is automatically re-seated within the seating aperture 164 by the force of the seating force spring 178. In alternate embodiments, the clamping collar 174 may be manually re-seated within the seating aperture 164. After the conductive pins 176 have been re-seated, the branches of the sensing circuit 180 are re-established. The cutting head 120 may be repositioned by the control gantry 40, and a cutting operation may be quickly and easily resumed.

The disengageable mount assembly 160 advantageously prevents breakage of the mixing tube 26 and other components of the cutting head 120 in the event of a collision. When a collision occurs, the cutting head 120 simply pivots out of the way. At the same time, collision detection signals are generated which cause the various subsystems to stop automatically. The disengageable mount assembly 160 allows the cutting head 120 to be returned to its pre-collision state with excellent repeatability, preserving the machines calibration and allowing the user to resume cutting without any re-homing operations. Following a collision, the mount assembly 160 may be quickly re-engaged and the cutting operation resumed without re-calibration or other time-consuming procedures.

One may note that although the disengageable mount assembly 160 has been shown in the figures and described in the foregoing discussion as being a Kelvin clamp, other disengageable mount assemblies are conceivable which may perform the function of pivoting the cutting head 120 out of the way in the event of a collision. Thus, while prior art collision sensing systems focused on attempting to avoid a collision, the apparatus and method of the present invention acknowledges that a collision may be unavoidable, and accommodates the collision by means of the disengageable mount assembly.

Figure 7:
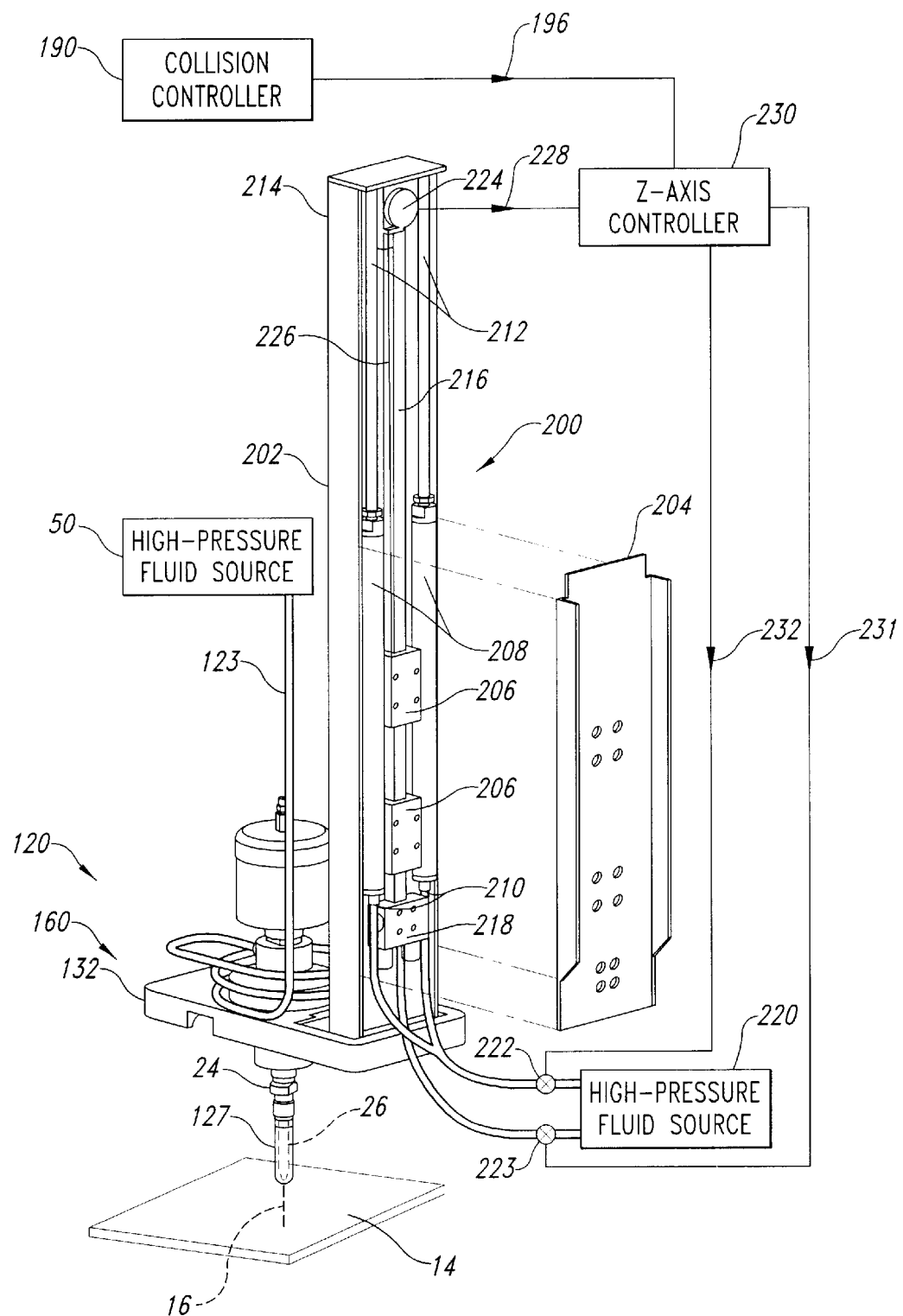
FIG. 7 is a partially-exploded back isometric view of the waterjet cutting system of FIG. 3.

FIG. 7 is a partially-exploded back isometric view of the waterjet cutting system 100 of FIG. 3. As shown in this view, the waterjet cutting system 100 includes a z-axis control system 200 disposed within a housing section 202. A back plate 204 is coupled to a pair of guide blocks 206 to enclose a backside of the housing section 202, and is coupled to the control gantry 40. Thus, the z-axis control system 200 is controllably positioned by the control gantry 40 along with the cutting head 120.

The z-axis control system 200 further includes a pair of air cylinders 208, each air cylinder having a first end 210 fixedly attached to the housing section 202 and a second end 212 attached to a slide member 214. The mounting arm 132 is attached to the slide member 214. A linear rail 216 is coupled to the slide member 214 and is disposed between the air cylinders 208. The linear rail 216 slideably engages the pair of guide blocks 206. An air brake 218 is attached to the slide member 214 and slideably engages the linear rail 216. The air cylinders 208 and the air brake 218 are fluidly coupled to a high-pressure air source 220. An first air control valve 222 controls to flow from the high-pressure air source 220 to the air cylinders 208, and a second air control valve 223 controls airflow to the air brake 218. The air brake 218 is preferably a "pressure to release" pneumatic brake that keeps the slide member 214 in position and prevents the slide member 214 (and cutting head 120) from falling in the event of a loss of air pressure.

A position sensor 224 is attached to the slide member 214 between the second ends 212 of the air cylinders 208. In this embodiment, the position sensor 224 includes a cable 226 attached to the uppermost guide block 206. One commercially-available position sensor suitable for this purpose, for example, is the LX-PA-15 String Potentiometer sold by Unimeasure, Inc. of Corvallis, Oreg. A z-axis controller 230 is electrically coupled to the position sensor 224, to the first and second air control valves 222, 223, and to the collision controller 190.

In operation, the z-axis control system 200 supports the weight of the cutting head 120, and rapidly raises and lowers the cutting head 120 by controlling the air pressure within the air cylinders 208. Thus, the air cylinders 208 provide a constant upward bias force that supports the weight of the cutting head 120, reducing the tracing force of the collision shield 127 on the workpiece 12. If a collision is detected by the collision controller 190, the collision controller 190 transmits the third collision detection signal 196 to the z-axis controller 230. The z-axis controller 230 transmits a brake control signal 231 to the second air control valve 223, thereby releasing the air brake 218, and also transmits an air control signal 232 to the first air control valve 222, increasing the air pressure within the air cylinders 208 and raising the slide member 214. One may note that the functions of the z-axis controller 230 and the collision controller 190 may be integrated into a single controller.

As the slide member 214 moves upwardly, the cable 226 is pulled out of the position sensor 224. The position sensor 224 determines the amount cable 226 drawn out by the movement of the slide member 214 and transmits a position signal 228 to the z-axis controller 230. In response to the position signal 228, the z-axis controller 230 transmits an air control signal 232 to the air control valve 222 to raise or lower above air pressure within the air cylinders 208.

It is understood that the actuation device of the z-axis control system 200 may be varied from the particular embodiment shown in FIG. 7 and described above. For example, rather than a pair of air cylinders 208, a single air cylinder may be employed. Alternately, the one or more air cylinders 208 may be replaced by linear motors. Commercially-available linear motors suitable for this purpose include, for example, those sold by Trilogy Systems of Webster, Tex. Generally, however, the air cylinders 208 are less expensive than alternate actuation devices. Commercially-available air cylinders suitable for this purpose include, for example, the Airpel® 16 mm Air Cylinders sold by the Airpot Corporation of Norwalk, Conn.

One advantage of the z-axis control system 200 is that it allows a unique mode of operation of the waterjet cutting system 100, referred to herein as "biased following." Using the biased following method, the cutting head 120 is engaged with the surface 14 of the workpiece 12. The height of the workpiece 12 is therefore measurable simply by measuring the position of the cutting head 120. Without the z-axis control system 200, however, the relatively large weight of the cutting head 120 would cause undue and acceptable loading on the workpiece 12, preventing the method of biased following from being used. The z-axis control system 200 advantageously provides a constant upward bias force that accommodates some or all of the way to the cutting head 120, thereby greatly reducing or eliminating the tracing force on the workpiece 12, allowing the method of biased following to be successfully used.

Another advantage of the z-axis control system 200 is that the cutting head 120 may be raised rapidly. Prior art ball-screw drive systems typically are capable of raising or lowering the cutting head at a rate of approximately 40 cm/min. Using linear actuation devices, the z-axis control system 200 is capable of raising or lowering the cutting head at a rate of approximately 40 cm/sec. Thus, the inventive z-axis control system is approximately 60 times faster than prior art drive systems.

The z-axis control system 200 has five basic modes of operation: (1) a biased following (or height sensing) cutting mode, (2) a set-height cutting mode, (3) a manual raise/lower mode, (4) a park mode, and (5) a calibration mode. The calibration mode is used to test the performance of the z-axis control system 200 or to set up the system for the first time. In brief, the pressure within the air cylinders is varied until a neutral pressure is found. The neutral pressure is the pressure at which the cutting head 120 and the slide member 214 and other components (collectively referred to as "the axis") will not move up or down with the air brake released. The upper and lower limits of a neutral pressure "dead band" are found and recorded. Also, the upper and lower travel limits of the axis are found and recorded. These data are used to set the values for the other movement modes, and the "dead band" data are used as a diagnostic tool to determine if the axis is in need of servicing due to excessive friction.

Figure 8A:
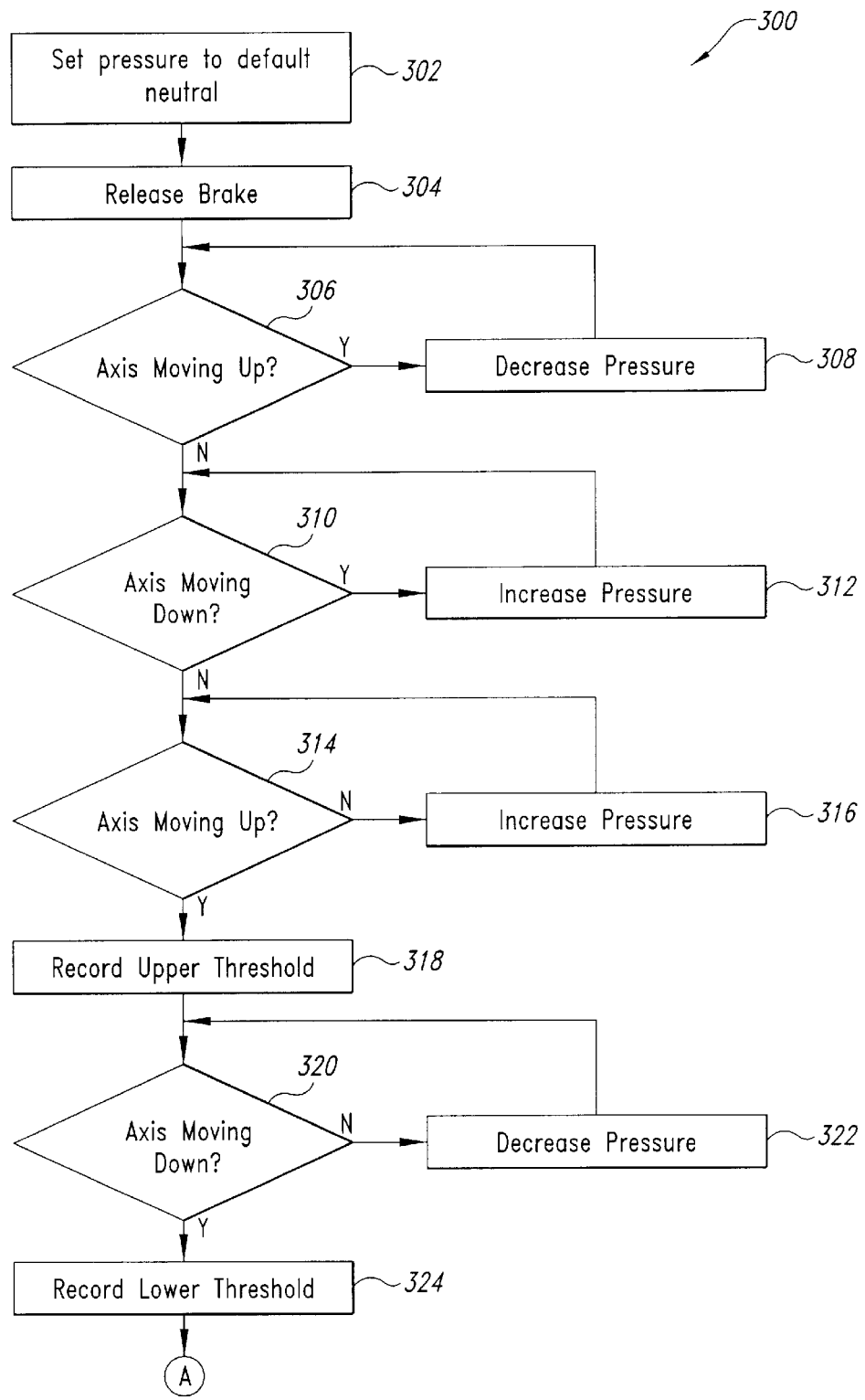
FIGS. 8A and 8B collectively provide a flowchart representation of a calibration routine of a z-axis control system in accordance with an embodiment of the invention.
Figure 8B:
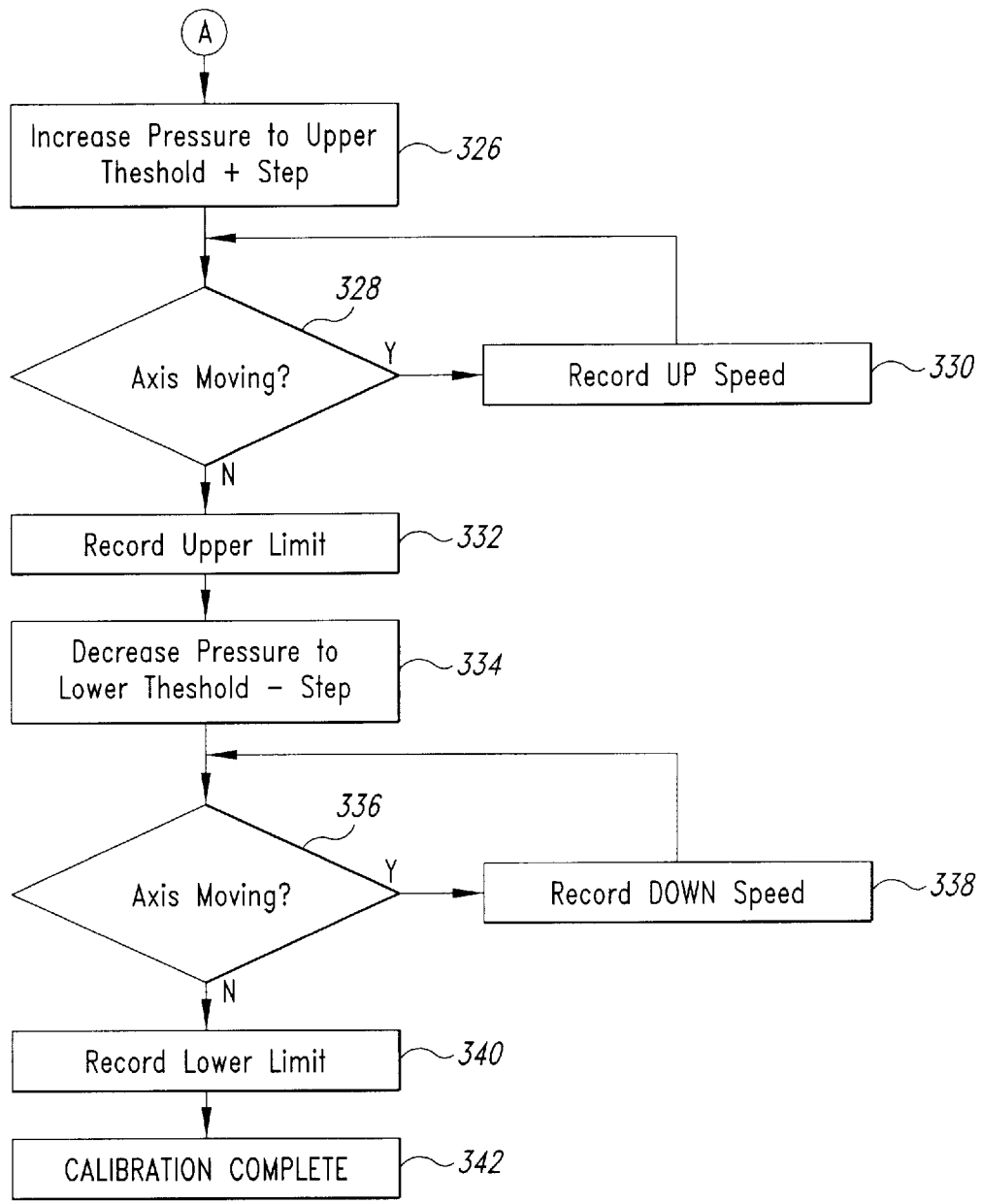

FIGS. 8A and 8B collectively provide a flowchart representation of a calibration routine 300 of the z-axis control system 200 in accordance with an embodiment of the invention. First, the pressure within the air cylinders is set to a default or neutral pressure 302 corresponding to a neutral, nonmoving position of the cutting head. Next, the air brake is released 304. After the air brake is released, a determination is made whether the axis is moving up 306. If the axis is moving up, the pressure within the air cylinders is incrementally decreased 308. The determination whether the axis is moving up 306, and the action of decreasing the pressure 308, are repeated until the axis is no longer moving up.

If it is determined that the axis is not moving up 306, a determination is made whether the axis is moving down 310. If z-axis is moving down, the pressure within the air cylinders is incrementally increased 312. The determination 310 and incremental pressure increase 312 are repeated until the axis is no longer moving down.

One may note that acts or actions 306 through 312 may not be necessary to the calibration procedure 300 if the default pressure setting 302 is indeed a neutral pressure setting. If, however, the default pressure setting 302 is not a neutral pressure setting, such as may be the case when, for example, one or more components of the cutting head have been modified or removed since the previous calibration, then the acts or actions 306 through 312 may be followed to establish an appropriate neutral pressure setting.

As shown in FIGS. 8A and 8B, if it is determined that the axis is not moving down, another determination is made whether the axis is moving up 314. If it is determined that the axis is not moving up, the pressure is incrementally increased 316, and the calibration procedure 300 returns to the determination whether the axis is moving up 314. The determination 314 and the incremental pressure increase 316 are repeated until the axis is moving up.

If the axis is moving up 314, an upper threshold pressure is recorded by the z-axis controller 318. The upper threshold pressure signifies the pressure in the air cylinders at which the axis will begin moving upwardly.

Next, a determination is made whether the axis is moving down 320. If it is determined that the axis is not moving down, the pressure is incrementally decreased 322. The calibration procedure 300 then returns to the determination whether the axis is moving down 320. The determination 320 and the incremental pressure decrease 322 are repeated until the axis is moving down.

If the axis is moving down 320, the z-axis controller records a lower threshold pressure 324. The lower threshold pressure signifies the pressure in the air cylinders at which the axis will begin moving downwardly.

Next, the pressure in the air cylinders is increased to the upper threshold pressure plus an incremental step pressure 326. A determination is then made whether the axis is moving 328. If the axis is moving, the speed of the upward movement of the axis is recorded 330. The determination whether the axis is moving 328 and about recording of the speed of upward movement 330 are repeated until the axis is no longer moving, and has reached its upper limit of travel. If the axis is not moving 328, an upper limit of travel is recorded 332.

The calibration procedure 300 then decreases the pressure in the air cylinders to the lower threshold pressure minus the incremental step pressure 334. Next, a determination is made whether the axis is moving 336. If the axis is moving, the speed of the downward movement of the axis is recorded 338. The determination 336 and the recording of the speed of downward movement 338 are repeated until the axis is no longer moving, and has reached its lower limit of travel. If the axis is not moving 336, a lower limit of travel is recorded 340. The calibration procedure 300 is then complete 342.

In the set-height cutting mode, the axis is moved manually or automatically into place. When moved automatically into place, the axis will move down until it engages the surface 14 of the workpiece 12 by lowering until the axis stops moving, then, if necessary, raising up to the proper standoff distance. The z-axis control system 200 then assumes a neutral pressure with the air brake engaged.

In the manual raise/lower mode, the axis is raised or lowered as commanded by the operator until the end of travel limits have been reached, or until the wear ring 129 of the collision shield 127 contacts the surface 14 of the workpiece 12. The axis may be raised or lowered, for example, by inputting a raise or lower movement command into the z-axis controller 190 by means of a keyboard (not shown). When the limits of travel have been reached, all travel ceases. When a movement command is removed, or the end of travel is reached, the axis receives a reverse-pressure signal to slow it down. The reverse-pressure signal may, for example, be based on velocity of the axis. When the axis is moving continuously, the axis seeks a constant velocity. Incremental moves may be based, for example, upon individual keystrokes of the keyboard (or individual mouse clicks, etc.) that movie axis a predetermined distance either up or down. In either the incremental or continuous movement case, the movement is terminated by engaging the air brake.

In the park mode, the axis is simply raised to its upper limit of travel and air brake is engaged. The pressure within the air cylinders is set at a neutral bias setting.

In the biased-following (or height-sensing) cutting mode, the axis has a slight downward bias pressure. The slight downward bias causes the axis to fall slowly, keeping the wear ring 129 in constant contact with the surface 14 of the workpiece 12. Stiction in the up direction is compensated for by rapidly moving the pressure up and down within the dead band between the lower threshold pressure and the upper threshold pressure. The air brake 218 is not engaged.

Figure 9:
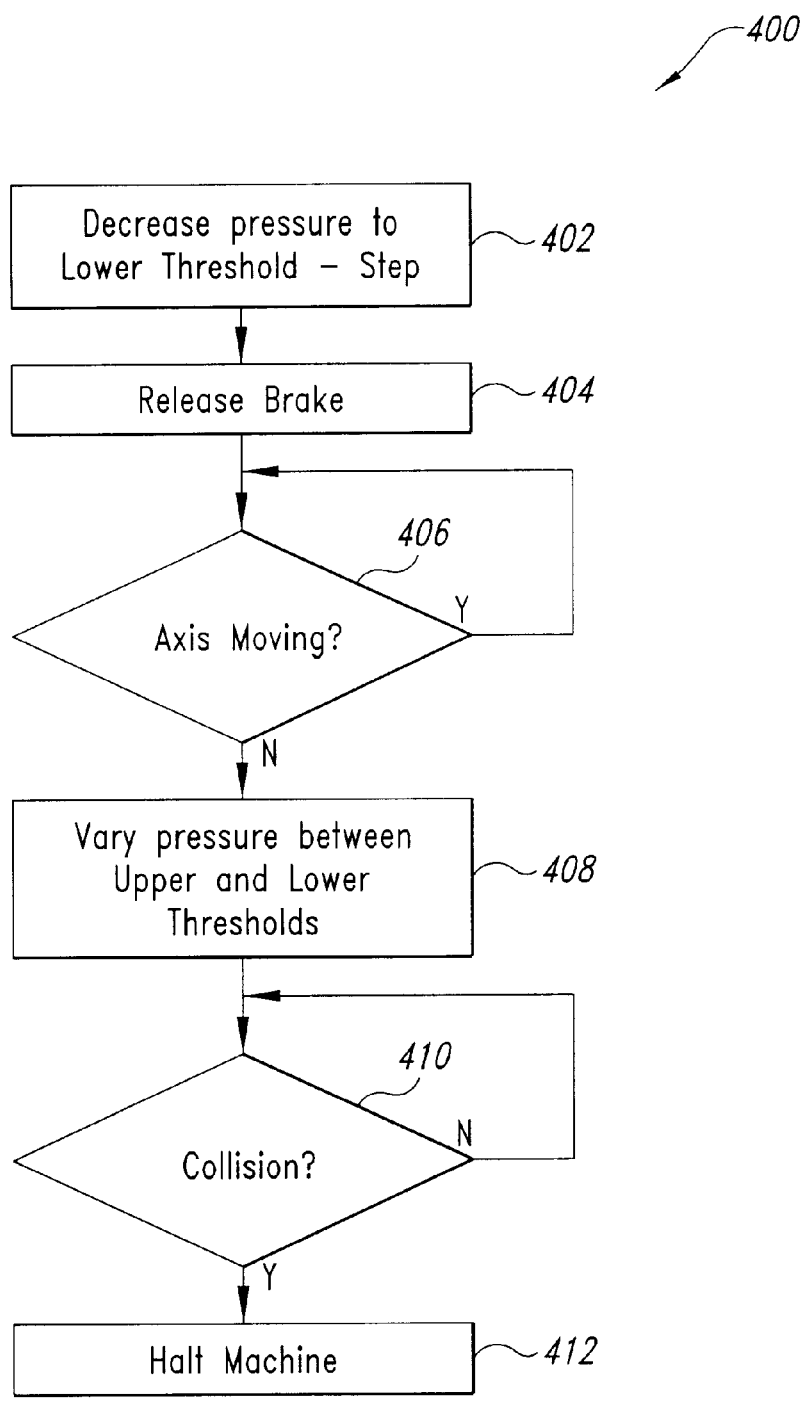
FIG. 9 is a flowchart representation of a biased-following routine of a z-axis control system in accordance with an embodiment of the invention.

FIG. 9 is a flowchart representation of a biased-following (or height-sensing) routine 400 of the z-axis control system 200 in accordance with an embodiment of the invention. In this embodiment, the biased-following routine 400 begins by decreasing the pressure in the air cylinders to the lower threshold pressure minus an incremental step pressure 402. Next, the air brake is released 404. A determination is then made whether the axis is moving 406. If the axis is moving, the determination 406 is repeated indefinitely until the axis is not moving. If the axis is not moving, the pressure in the air cylinders is varied between the upper and lower threshold pressures 408. Next, a determination is made whether a collision has occurred 410. If a collision has not occurred, the collision determination 410 is simply repeated indefinitely. If a collision has occurred, the z-axis control system 200 is halted 412. Alternately, if a collision has occurred, the pressure in the air cylinders may be increased to rapidly raise the axis away from the workpiece.

Another advantage of the z-axis control system 200 is that it automatically compensates for changes in friction and/or weight of system components such as, for example, the air cylinders 208, the linear rail 216, the guide blocks 206, wear parts such as bearings, and other system components. The z-axis controller 230 automatically compensates by adjusting the pressure within the air cylinders 208 to lower the slide member 214, maintaining the engagement of the wear ring 129 with the surface 14 of the workpiece 12 in the biased-following mode of operation, or at a constant height above the surface 14 in the set-height mode of operation. In this way, the standoff distance d is maintained at the desired value despite changes in friction and/or weight of the various system components.

Figure 10:
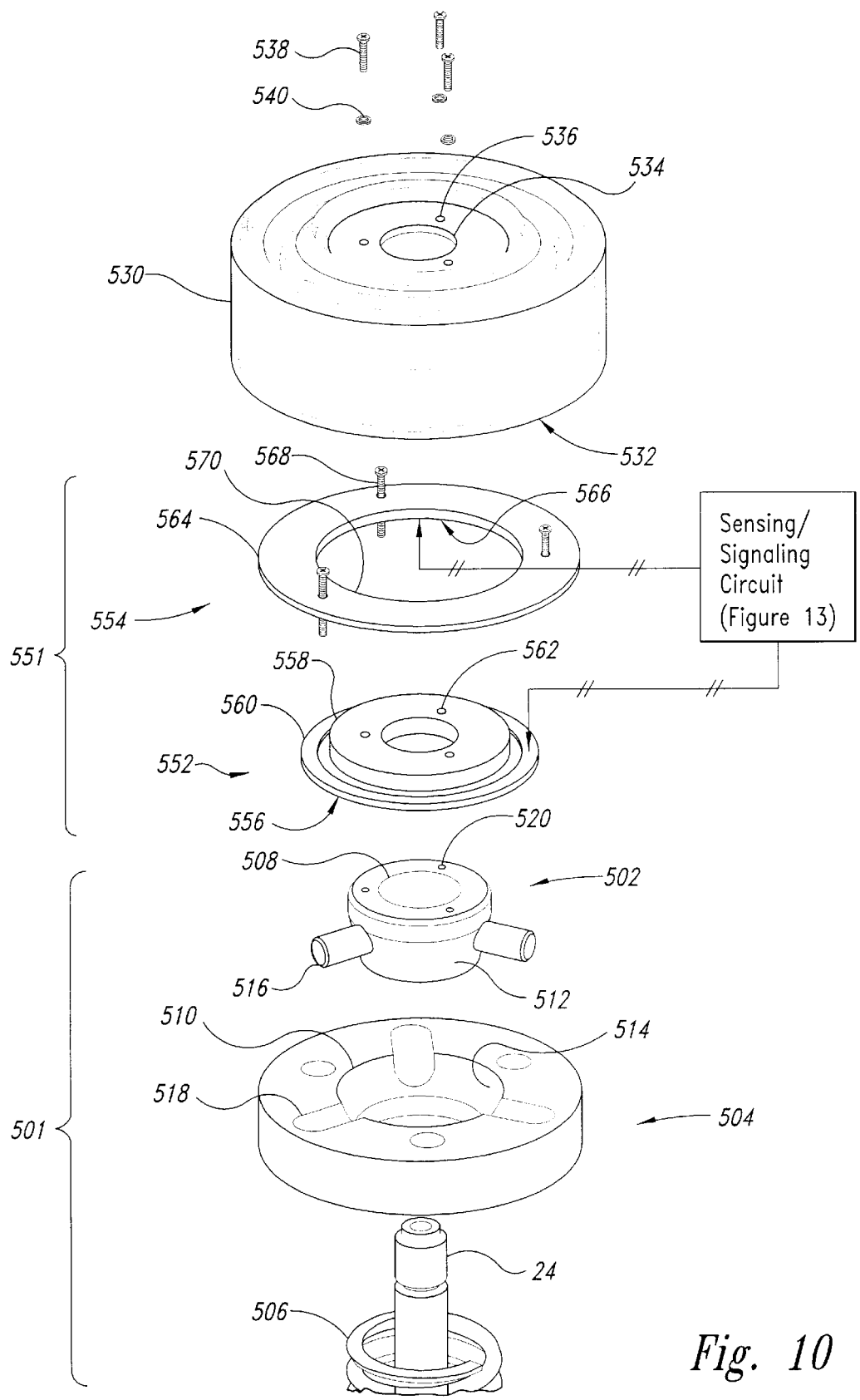
FIG. 10 is an exploded isometric view of a mount assembly according to another embodiment of the present invention.

FIG. 10 illustrates a deflectable mounting assembly 501 and a collision circuit assembly 551 according to another embodiment of the present invention. The deflectable mounting assembly 501 includes, in relevant part, a clamping collar 502, a retainer 504, and a seating force spring 506. Except as described in detail below, these elements can be structurally and functionally the same as those described in detail above in connection with a previous embodiment of the invention.

The clamping collar 502 has a first axial opening 508 and the retainer 504 has a second axial opening 510, both aligned coaxially for receiving at least a portion of the nozzle body 24 when configured for operation. The clamping collar 502 has an external seating surface 512 and the retainer 504 has a complementary internal seating surface 514 for allowing the clamping collar to be securely seated within the retainer during operation. The external seating surface 512 and the internal seating surface 514 can be conically tapered or otherwise shaped to allow the clamping collar 502 to pivot about a radial axis of the retainer 504 when seated therein. When seated properly, however, the clamping collar 502 rests securely in a known orientation with respect to the retainer 504. The clamping collar 502 of the illustrated embodiment has three pins 516 projecting outwardly from the external seating surface 512 at approximately equal spacing about the perimeter of the clamping collar. The illustrated retainer 504 is adapted with complementary pin cavities 518 for receiving the pins 516 on the clamping collar 502 when the clamping collar is seated within the retainer. The pins 516 and the pin cavities 518 help retain the clamping collar in the desired orientation with respect to the retainer. The clamping collar 502 has three threaded opening 520 for receiving a threaded screw or similar fastener.

Figure 11:
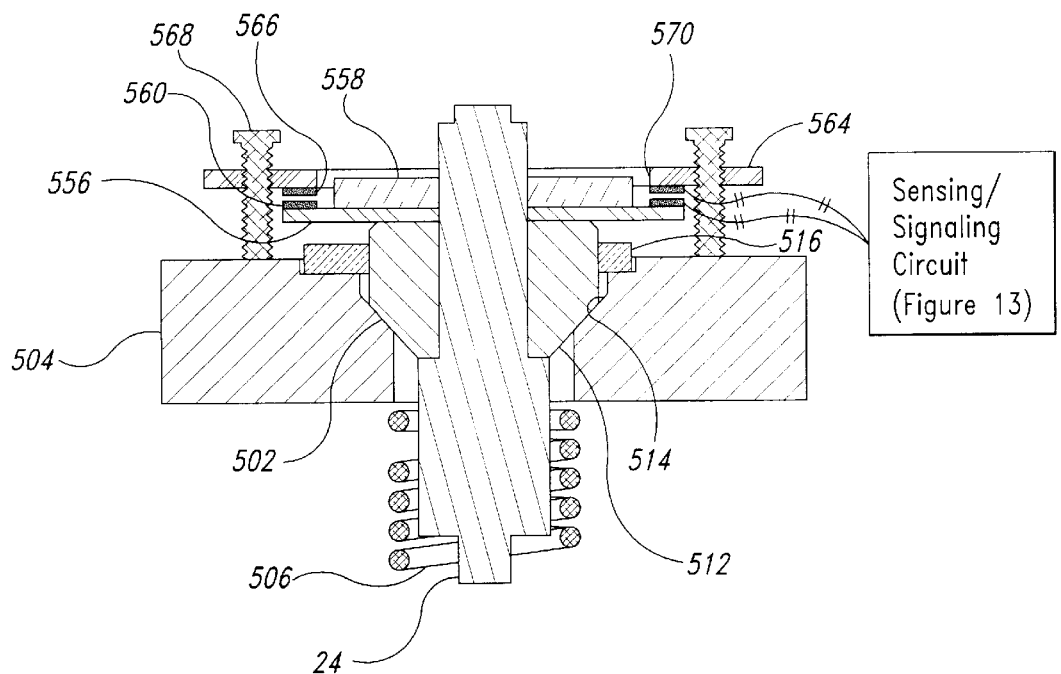
FIG. 11 is a sectional elevation view of the mount assembly of FIG. 10 in a first configuration, as viewed along a diametric section.

The collision circuit assembly 551 incorporates a first contact member 552 and a second contact member 554. As best illustrated in FIG. 11, the first contact member incorporates a base disk 556, a central disk 558, and a first contact 560. In the illustrated embodiment, the central disk 558 and the first contact 560 are attached to an upper surface of the base disk 556. The base disk 556, central disk 558, and first contact 560 can be attached together by any known means in the art, or can be, at least partially, of unitary construction. The base disk 556 and the central disk 558 have central openings sized and aligned to allow the nozzle body 24 to project through the disks during operation.

The first contact 560 is an annular, metallic contact extending around the entire perimeter of the base disk 556, outside of the central disk 558. In the illustrated embodiment, the central disk 558 is fabricated from a non-conductive material, while the first contact 560 is fabricated from a conductor, such as gold, steel, or another suitable material. The first contact member 552 has three opening 562 arranged to align with the threaded openings 520 of the clamping collar 502. As discussed in more detail later, the first contact member 552 can thus be fixedly coupled to the clamping collar 502 to move with the clamping collar when the cutting head collides with an obstruction.

The second contact member 554 of the illustrated embodiment consists of an upper ring 564, a second contact 566 attached to the underside of the upper ring, and a plurality of threaded members 568 threadably engaged with the upper ring. The upper ring 564 has an opening 570 sized to receive the central disk 558 of the first contact member 552 when the system is configured for operation. The second contact 556 is positioned generally above the first contact 560 in this configuration, and is close enough to the first contact such that the first contact touches the second contact when the mounting assembly 501 moves as a result of a collision.

The threaded members 568 project downward through the upper ring 564 and rest upon the retainer 504 to space the upper ring from the retainer and, more importantly, to space the second contact 566 from the first contact 560. The threaded members 568 can be adjusted to set the spacing between the first and second contacts 560/566 as desired for a particular situation. In the illustrated embodiment, the second contact 566 is spaced from the first contact 560 by approximately one millimeter to signal a collision when the cutting head is displaced by approximately 7–8 millimeters. This spacing can be increased or decreased, however, to vary the sensitivity of the system to suit a particular situation. The spacing can be set by the manufacturer, and can be subsequently adjusted, as necessary.

The second contact member 554 of the illustrated embodiment thus rests loosely on top of the retainer 504 in position to detect movement of the mounting assembly 501. The central disk 558 retains the second contact member 554 in the proper radial alignment while the threaded members 568 retain the second contact member in the proper axial alignment.

As illustrated in FIG. 10, this embodiment of the present invention also incorporates a resilient cover 530. The resilient cover 530 is made from a thin, resilient material that allows the cover to be temporarily deformed without failing. A lower cavity 532 in the resilient cover 530 is sized to receive the second contact member 554, the first contact member 552, the clamping collar 502 and at least a portion of the retainer 504. The resilient cover 530 can then be sealably attached to the retainer 504 to seal the elements therein from the external environment. The resilient cover 530 has a central opening 534 for receiving the upper end of the nozzle body 24. The gap between the nozzle body 24 and the central opening 534 can be sealed during operation using any known means in the art. Three holes 536 in the resilient cover 530 are aligned to receive screws 538 or other fasteners. These screws 538, as discussed above, pass through the first and second contact members 552/554 and engage the clamping collar 502 at holes 520 to retain the cover 530 and the first contact member against the clamping collar. Washers 540 can be inserted between the screws 538 and the resilient cover 530 to prevent water from entering the cover through the holes 536.

Figure 12:
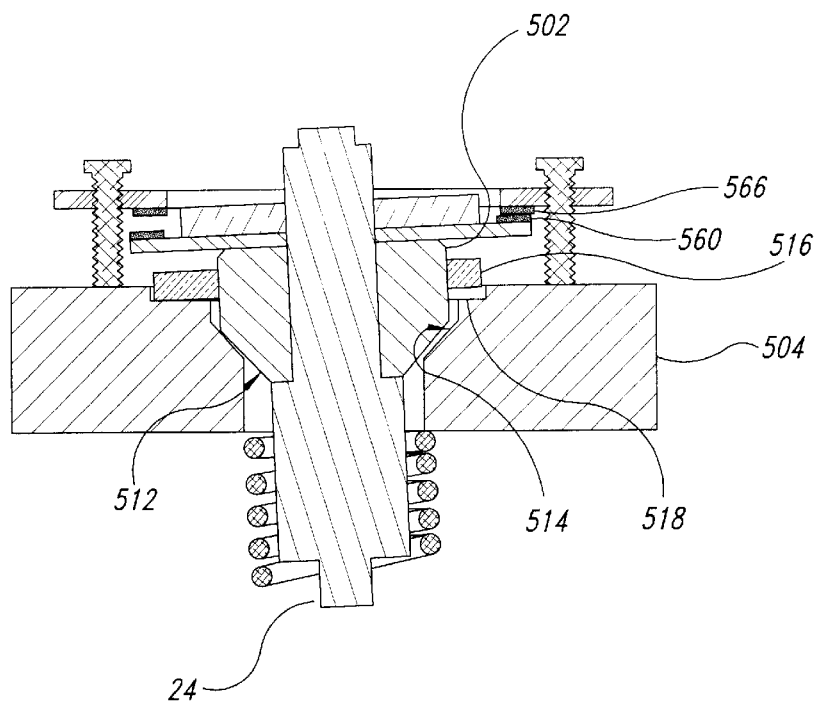
FIG. 12 is a sectional elevation view of the mount assembly of FIG. 11 in a second configuration.
Figure 13:
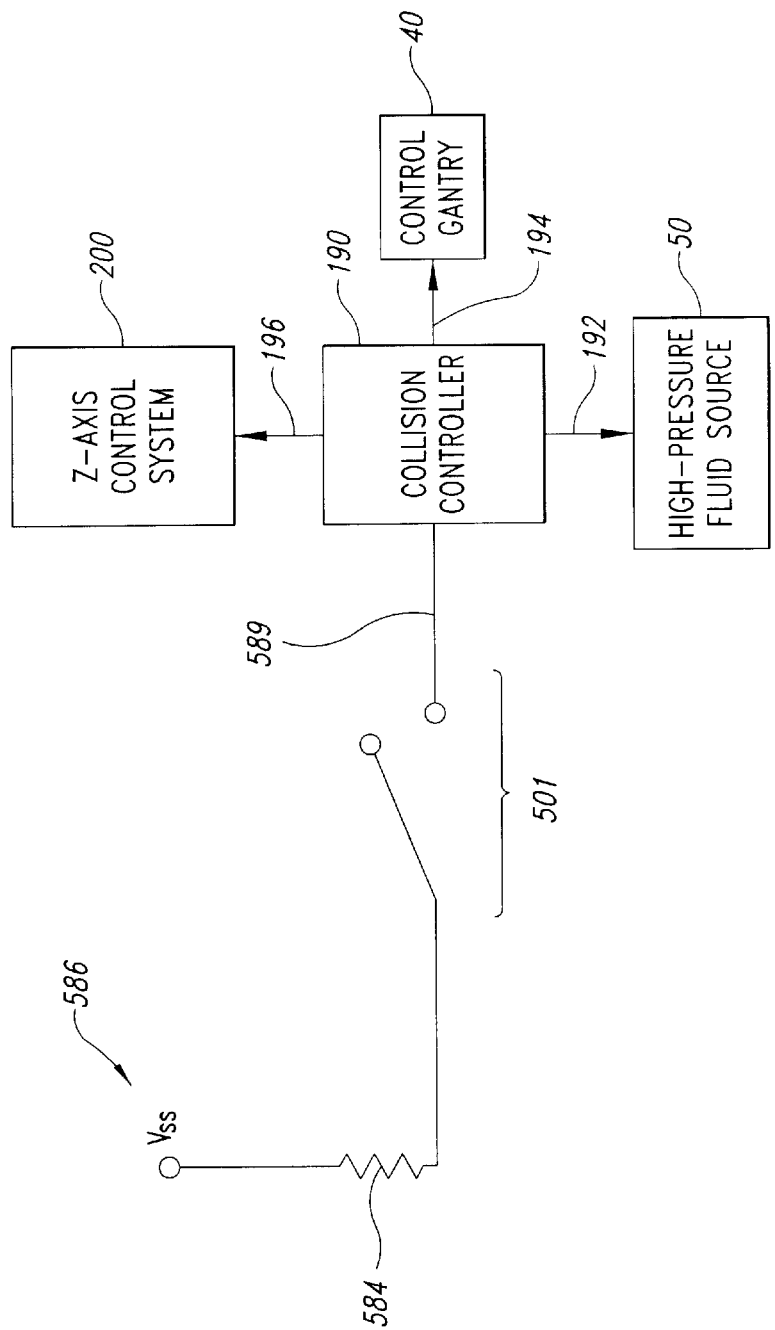
FIG. 13 is a schematic view of a collision sensing circuit according to another embodiment of the present invention.

FIGS. 11 and 12 illustrate the present embodiment during operation and upon collision, respectively. The deflectable mounting assembly 501 and collision circuit assembly 551 are configured for operation of the cutting system in FIG. 11. In FIG. 12, the deflectable mounting assembly 501 has been moved as a result of a collision, and the collision circuit assembly 551 has closed to signal the collision and shut down one or more of the internal systems. When the mixing jet or nozzle body collides with an object, the nozzle body 24, and with it the clamping collar 502, rotate with respect to the retainer 504. This rotation reduces the likelihood that the mixing jet and other parts will be damaged. This rotation also moves the first contact member 552 until the first contact 560 touches the second contact 566 (FIG. 12). The contact between the first contact 560 and the second contact 566 closes the sensing/signaling circuit illustrated in FIG. 13, resulting in signals to the gantry, the high pressure system, the z-axis control, and/or other internal systems, as described in the embodiment above. Once the system is shut down, the obstruction can be removed, often before any damage occurs to the mixing tube and other parts.

As a result of the rotation of the nozzle body 24 with respect to the retainer 504, the seating force spring 506 compresses on the side opposite the obstruction. Once the obstruction is removed, the restoring force in the spring 506 moves the nozzle body 24 back to the operating position, as discussed above.

Because the second contact member 554 is loosely resting on the retainer 504, the force that the first contact member 552 exerts on the second contact member causes the second contact member to lift off of the retainer. This movement of the second contact member 554 can prevent the second contact member or other parts of the system from breaking upon collision.

The present embodiment of the invention can be modified in many ways without deviating from the spirit of the invention. For example, the clamping collar 502 can be fabricated without pins 516, or with more pins than the three illustrated in FIG. 10. Likewise, the relative shapes of the retainer 504 and the clamping collar 502 can be modified to suit a particular situation, so long as the two parts are sufficiently complementary to each other to allow the clamping collar to rest in the proper configuration with respect to the retainer during operation, and to rotate during collision.

Likewise, the first and second contact members 552/554 can have a wide variety of shapes and sizes while not deviating from the essence of the present invention. For example, the first and second contacts 560/566 can be fabricated from a plurality of separate contact members spaced about the entire perimeter of one or both of the contact members. Further, the second contact member 554 can be weighted or otherwise urged toward the first contact member 552, such as by a spring, to reduce the likelihood that the second contact member bounces upon being contacted by the first contact member.

Improved apparatus and methods for z-axis control and collision recovery of cutting heads of waterjet cutting systems have been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims, which follow.

What is claimed is:

1. A disengageable mount assembly for a cutting head of a waterjet cutting system, comprising:
   a retainer attachable to a mounting arm of a waterjet cutting system, the retaining having a seating aperture and a plurality of pin cavities disposed therein, each pin cavity having a pair of pockets disposed on opposite lateral sides thereof;
   a plurality of pairs of conductive strike pads, each strike pad being disposed within one of the pockets;
   a plurality of pairs of conductive balls, each conductive ball being disposed within one of the pockets, each ball being in contact with one of the strike pads;
   a clamping collar coupleable to the cutting head and at least partially disposed within the seating aperture, the clamping collar having a plurality of conductive pins projecting outwardly therefrom, each conductive pin being disengageably disposed within one of the pin cavities and disengageably contacting the pair of conductive balls;
   a seating force spring engageable with the mounting arm to urge the clamping collar into alignment with the retainer;
   a tensioner coupleable with the cutting head and engageable with the seating force spring to at least partially compress the seating force spring; and
   a sensing circuit attached to the retainer and having a plurality of sensing branches, each sensing branch operatively coupled to at least one of the strike pads and to at least one of the conductive balls.

2. The disengageable mount assembly according to claim 1 wherein the plurality of pin cavities comprises three pin cavities and the plurality of conductive pins comprises three conductive pins.

3. The disengageable mount assembly according to claim 1 wherein the seating force spring comprises a coil spring.

4. The disengageable mount assembly according to claim 1 wherein the seating aperture is substantially alignable with a mounting aperture of the mounting arm.

5. The disengageable mount assembly according to claim 1, further comprising a shield member having a first end attachable to the cutting head and a second end engageable with a workpiece.

6. The disengageable mount assembly according to claim 1, further comprising a controller operatively coupled to the sensing circuit.

7. The disengageable mount assembly according to claim 6 wherein the controller transmits a collision detection signal to a control gantry of the waterjet cutting system.

8. A disengageable mount assembly for a cutting head of a waterjet cutting system, comprising:
   a first mount member coupleable to a controllably positionable portion of the waterjet cutting system;
   a second mount member coupleable to the cutting head and disengageably coupled to the first mount member; and
   a sensing circuit having a plurality of first conductive elements disposed on the first mount member and a plurality of second conductive elements disposed on the second mount member.

9. The disengageable mount assembly according to claim 8 wherein the first mount member comprises a retainer having a seating aperture disposed therethrough and a plurality of pin cavities disposed therein, each pin cavity having a pair of rounded pockets disposed on opposite lateral sides thereof, and wherein the plurality of first conductive elements comprises a conductive strike pad disposed within each of the pockets and a conductive ball disposed within each of the pockets and in contact with the strike pad.

10. The disengageable mount assembly according to claim 9 wherein the second mount member comprises a clamping collar at least partially disposed within the seating aperture, and wherein the plurality of second conductive elements comprises a plurality of conductive pins projecting outwardly from the clamping collar, each conductive pin being disengageably disposed within one of the pin cavities and disengageably contacting a pair of conductive balls.

11. The disengageable mount assembly according to claim 8, further comprising a biasing device that biases the second mount member into contact with the first mount member.

12. The disengageable mount assembly according to claim 11 wherein the biasing device comprises a coil spring.

13. The disengageable mount assembly according to claim 8, further comprising a controller operatively coupled to the sensing circuit and monitoring a collision-sensing signal.

14. A waterjet cutting system for cutting a workpiece, comprising:
   a cutting head having a high pressure fluid inlet coupleable to a source of high-pressure fluid;
   a first mount member coupleable to a controllably positionable portion of the cutting system;
   a second mount member coupled to the cutting head and disengageably coupled to the first mount member; and
   a sensing circuit having a plurality of first conductive elements disposed on the first mount member and a plurality of second conductive elements disposed on the second mount member.

15. The waterjet cutting system according to claim 14 wherein the first mount member comprises a retainer having a seating aperture disposed therethrough and a plurality of pin cavities disposed therein, each pin cavity having a pair of rounded pockets disposed on opposite lateral sides thereof, and wherein the plurality of first conductive elements comprises a conductive strike pad disposed within each of the pockets and a conductive ball disposed within each of the pockets and in contact with the strike pad.

16. The waterjet cutting system according to claim 15 wherein the second mount member comprises a clamping collar at least partially disposed within the seating aperture, and wherein the plurality of second conductive elements comprises a plurality of conductive pins projecting outwardly from the clamping collar, each conductive pin being disengageably disposed within one of the pin cavities and disengageably contacting a pair of conductive balls.

17. The waterjet cutting system according to claim 14, further comprising a biasing device engageable with the cutting head to bias the second mount member into contact with the first mount member.

18. The waterjet cutting system according to claim 14, further comprising a controller operatively coupled to the sensing circuit and monitoring a collision-sensing signal.

19. The waterjet cutting system according to claim 14, further comprising a control gantry coupled to the mounting surface and having a drive assembly that controllably positions the cutting head throughout an x-y plane that is aligned to be substantially parallel to the surface of the workpiece.

20. The waterjet cutting system according to claim 14, further comprising a source of high-pressure fluid.

21. The waterjet cutting system according to claim 14, further comprising:
   a linear rail alignable with an axis that extends outwardly with respect to the workpiece;
   a slide member coupled to the mounting surface and slideably coupled to the linear rail;
   at least one actuator aligned with the linear rail and having a first end coupled to the slide member and a second end fixed with respect to the linear rail;
   a position sensor coupled to the slide member; and
   a controller operatively coupled to the position sensor and to the actuator, the controller receiving a position signal from the position sensor and transmitting a control signal to the actuator.

22. The waterjet cutting system according to claim 21 wherein the actuator comprises a pneumatic cylinder having an air valve coupleable to a source of high-pressure air, the controller being operatively coupled to the air valve.

23. The waterjet cutting system according to claim 22, further comprising a source of high-pressure air coupled to the air valve.

24. The waterjet cutting system according to claim 21, further comprising a contact member having a first end attached to the cutting head and a second end engageable with a surface of the workpiece.

25. The waterjet cutting system according to claim 21 wherein the actuator comprises a first pneumatic cylinder having a first air valve coupleable to a source of high-pressure air, further comprising a second pneumatic cylinder having a second air valve coupleable to the source of high-pressure air, the controller being operatively coupled to the second air valve and sending a second control signal to control the second air valve.

26. An assembly for mounting a cutting head on a waterjet cutting system and for generating a signal when the cutting head collides with an object, the assembly comprising:
   a retainer coupleable to a mounting arm of the waterjet cutting system, the retainer having a first seating surface;
   a clamping collar coupleable to the cutting head, the clamping collar having a second seating surface, the clamping collar being rotatable about at least one radial axis of the clamping collar with respect to the retainer, the second seating surface being in contact with the first seating surface when the clamping collar is in an operative position;
   a first contact member coupled to the clamping collar to move with the clamping collar;
   a second contact member positioned adjacent the first contact member and spaced therefrom by a predetermined distance such that, when the clamping collar is in the operative position there is a gap between the first and second contact members, and when the clamping collar is out of the operative position by more than a predetermined angle the first contact member is in contact with the second contact member, and
   a sensing circuit coupleable to the first and second contact members to generate a signal when the first contact member is in contact with the second contact member.

27. The assembly of claim 26 wherein the retainer is coupleable to a first side of the mounting arm with the first seating surface facing away from the mounting arm, and further comprising a biasing member engageable with a second side of the mounting arm opposite the first side to urge the clamping collar against the retainer and into the operative position.

28. The assembly of claim 26, further comprising a biasing member and a tensioning member, the retainer being coupleable to a first side of the mounting arm with the first seating surface facing away from the mounting arm, the biasing member being engageable with a second side of the mounting arm opposite the first side to generate a restoring force to urge the clamping collar against the retainer and into the operative position, and the tensioning member being adjustably engageable with the biasing member to increase and/or decrease the restoring force.

29. The assembly of claim 26, further comprising a biasing member engageable with the assembly to urge the clamping collar against the retainer and into the operative position.

30. The assembly of claim 26 wherein the second contact member has an annular portion encircling at least a portion of the first contact member such that rotation of the clamping collar about the radial axis of the clamping collar will result in the first contact member coming into contact with the second contact member.

31. The assembly of claim 26 wherein the first and second contact members are annular and oriented in substantially parallel planes when the clamping collar is in the operative position, the second contact member being positioned relative to the first contact member such that rotation of the clamping collar about the radial axis of the clamping collar will result in the first contact coming into contact with the second contact.

32. The assembly of claim 26, further comprising a controller operatively coupled to the sensing circuit.

33. The assembly of claim 26, further comprising a controller operatively coupled to the sensing circuit, the controller being configured to transmit the signal to a control gantry of the waterjet cutting system.

34. The assembly of claim 26, further comprising a controller operatively coupled to the sensing circuit, the controller being configured to transmit the signal to a high pressure fluid control of the waterjet cutting system.

35. An assembly for mounting a cutting head on a waterjet cutting system and for generating a signal when the cutting head collides with an object, the assembly comprising:
a first mount member fixedly coupleable to a controllably positionable portion of the waterjet cutting system;
a second mount member fixedly coupleable to the cutting head and movably positioned against the first mount member to move with respect to the first mount member between an operative position and a collision position; and
a sensing circuit having a first conductive element fixedly coupled to the second mount member to move with the second mount member, and a second conductive element positioned to be a predetermined distance from the first conductive element when the second mount member is in the operative position and to be in contact with the first conductive element when the second mount member is in the collision position.

36. The assembly of claim 35, further comprising a biasing member that urges the second mount member against the first mount member and into the operative position.

37. The assembly of claim 35 wherein the second conductive element has an annular portion encircling at least a portion of the first conductive element such that movement of the second mount member from the operative position to the collision position will result in the first conductive element coming into contact with the second conductive element.

38. The assembly of claim 35 wherein the second mount member is rotatably coupled to the first mount member and the second conductive element has an annular portion encircling at least a portion of the first conductive element such that rotation of the second mount member from the operative position to the collision position will result in the first conductive element coming into contact with the second conductive element.

39. The assembly of claim 35 wherein the second mount member is rotatably coupled to the first mount member and the first and second conductive elements are annular and are substantially parallel when the second mount member is in the operative position, the second conductive element being positioned relative to the first conductive element such that rotation of the second mount member from the operative position to the collision position will result in the first conductive element coming into contact with the second conductive element.

40. The assembly of claim 35 further comprising a cover positionable over the first and second conductive elements to prevent water from contacting the first and second conductive elements.

41. The assembly of claim 35 further comprising a first cover positionable ona first side of the first and second conductive elements and a second cover positionable on an opposing second side of the first and second conductive elements to prevent water from contacting the first and second conductive elements.

42. A waterjet cutting system for cutting a workpiece, comprising:
a cutting head having a high pressure fluid inlet configured to communicate with a source of high-pressure fluid, the cutting head being movably coupled to a controllably positionable portion of the cutting system to move with respect thereto between an operative position and a collision position;
a first conductive element coupled to the cutting head such that movement of the cutting head with respect to the controllably positionable portion of the cutting system results in movement of the first conductive element with respect to the controllably positionable portion of the cutting system;
a second conductive element coupled to the cutting system to move only with the controllably positionable portion of the cutting system, the second conductive element being spaced apart from the first conductive element when the cutting head is in the operative position, and being in contact with the first conductive element when the cutting head is in the collision position; and
a sensing circuit coupleable to the first and second conductive elements to generate a signal when the cutting head is in the collision position.

43. The system of claim 42 wherein the cutting head is pivotally coupled to the controllably positionable portion of the cutting system.

44. The system of claim 42 wherein the controllably positionable portion of the cutting system is a mounting arm.

45. The system of claim 42 wherein the controllably positionable portion of the cutting system is a mounting arm and the cutting head is pivotally coupled to the mounting arm.

46. The system of claim 42, further comprising a retainer and a clamping collar and wherein the controllably positionable portion of the cutting system is a mounting arm, the retainer being coupled to the mounting arm and having a first seating surface, the clamping collar being coupled to the cutting head and having a second seating surface, the second seating surface being in stable contact with the first seating surface when the cutting head is in the operative position, and the clamping collar being rotatable about at least one of its radial axes with respect to the retainer to allow the cutting head to move between the operative position and the collision position.

47. The system of claim 42 wherein the second conductive element has an annular portion encircling at least a portion of the first conductive element such that movement of the second mount member from the operative position to the collision position will result in the first conductive element coming into contact with the second conductive element.

48. The system of claim 42 wherein the second mount member is rotatably coupled to the first mount member and the second conductive element has an annular portion encircling at least a portion of the first conductive element such that rotation of the second mount member from the operative position to the collision position will result in the first conductive element coming into contact with the second conductive element.

49. The system of claim 42 wherein the second mount member is rotatably coupled to the first mount member and the first and second conductive elements are annular and are substantially parallel when the second mount member is in the operative position, the second conductive element being positioned relative to the first conductive element such that rotation of the second mount member from the operative position to the collision position will result in the first conductive element coming into contact with the second conductive element.

50. The system of claim 42 further comprising a cover positionable over the first and second conductive elements to prevent water from contacting the first and second conductive elements.

51. The system of claim 42 further comprising a first cover positionable on a first side of the first and second conductive elements and a second cover positionable on an opposing second side of the first and second conductive elements to prevent water from contacting the first and second conductive elements.

* * * * *